United States Patent
Nakamura

(10) Patent No.: US 7,050,089 B2
(45) Date of Patent: May 23, 2006

(54) ON-VEHICLE VIDEO CAMERA

(75) Inventor: Yoshiyuki Nakamura, Chiba (JP)

(73) Assignee: Sony Corporation (JP)

( * ) Notice: Subject to any disclaimer, the term of this patent is extended or adjusted under 35 U.S.C. 154(b) by 289 days.

(21) Appl. No.: 10/079,440

(22) Filed: Feb. 19, 2002

(65) Prior Publication Data

US 2002/0118282 A1  Aug. 29, 2002

(30) Foreign Application Priority Data

Feb. 20, 2001  (JP) ............................ P2001-043906

(51) Int. Cl.
*H04N 7/18* (2006.01)

(52) U.S. Cl. .................. 348/148; 348/156; 348/151; 348/143; 348/207; 348/118; 359/872; 359/604; 340/901

(58) Field of Classification Search ................ 348/148, 348/151, 156, 143, 207, 118; 359/872, 604; 340/901, 904; 362/459, 494, 466
See application file for complete search history.

(56) References Cited

U.S. PATENT DOCUMENTS

| | | | | |
|---|---|---|---|---|
| 5,574,443 | A * | 11/1996 | Hsieh | 340/901 |
| 6,520,667 | B1 * | 2/2003 | Mousseau | 362/494 |
| 6,583,730 | B1 * | 6/2003 | Lang et al. | 348/143 |
| 6,698,905 | B1 * | 3/2004 | Whitehead | 359/872 |

* cited by examiner

*Primary Examiner*—Shawn S. An
(74) *Attorney, Agent, or Firm*—Lerner, David, Littenberg, Krumholz & Mentlik, LLP

(57) ABSTRACT

An on-vehicle video camera includes an imaging unit which converts image light into an electrical imaging signal to output the imaging signal as a video signal in a predetermined format, a light emitting unit for lighting an imaging area of the imaging unit, and a control unit for controlling the imaging operation of the imaging unit and the lighting operation of the light emitting unit so as to be operably synchronized with each other. The light emitting unit includes a unit for emitting infrared light in a predetermined band. The imaging unit does not filter out an infrared signal component in the predetermined band which is contained in the imaging signal. The imaging unit and the light emitting unit are housed by a housing which forms an outside mirror of a vehicle.

3 Claims, 7 Drawing Sheets

ON-VEHICLE VIDEO CAMERA

BACKGROUND OF THE INVENTION

1. Field of the Invention

The present invention relates to an on-vehicle video camera which is mounted on a vehicle such as an automobile and which is suitable for providing visibility of an area to the left or right side of the vehicle.

2. Description of the Related Art

Typically, vehicles such as automobiles include an inside mirror, called a rearview mirror, and outside mirrors, called sideview mirrors, in position, to easily provide increased visibility of the driver's blind-spot areas to the rear, left, and right sides, etc., of the vehicle.

In some kinds of vehicles, however, structurally, the above-noted mirrors may sometime be insufficient to provide visibility of such areas. In order to overcome this inconvenience, various kinds of so-called back monitor systems have been put into practice in which a rear-vision video camera is attached to the rear end of a vehicle so that an image captured by the video camera may be displayed on a monitor at a position visible to a driver.

The on-vehicle video cameras for use in typical back monitor systems often use relatively compact photographic video cameras which are available for normal photography without being changed or with a slight modification. If such a commercially available standard video camera is used, an image can be captured in sufficient light, resulting in a successful image obtained from the output of the video camera when driving outside during the daytime. During night travel, however, a video camera is likely to capture an image in light as low as the video camera can, and the image displayed on a monitor would possibly make the captured object unidentifiable.

Since taillights of an automobile include a backup light which is turned on in response to the vehicle moving in reverse, the backup light may be used for a light source for illuminating the imaging area of a video camera for use in a back monitor system. Thus, night photography can be achieved at a certain level of illuminance.

Another recent proposal is that a video camera for use in applications other than a back monitor system is mounted on an automobile to provide visibility for a driver. However, there is no light source for a video camera for use in applications other than a back monitor system which is turned on in response to the operation of the automobile, leading to a problem in that a video camera which is mounted on the vehicle in order to photograph a particular area may not be used during night travel. For instance, a driver usually uses an outside mirror, called a sideview mirror, to view an area to the left or right side of the automobile; however, only use of outside mirrors may not provide sufficient visibility of the driver's blind spot areas. Thus, there has been proposed a video camera mounted at a predetermined position on the left or right side of an automobile to provide increased visibility. However, it is difficult for such a video camera mounted at a position on the left or right side to successfully photograph during night travel unless a special camera for night vision is used.

SUMMARY OF THE INVENTION

Accordingly, it is an object of the present invention to provide an on-vehicle video camera capable of successful photography both in the daytime and at night.

To this end, an on-vehicle video camera according to the present invention includes an imaging unit which converts image light into an electrical imaging signal to output the imaging signal as a video signal in a predetermined format, a light emitting unit for lighting an imaging area of the imaging unit, and a control unit for controlling the imaging operation of the imaging unit and the lighting operation of the light emitting unit so as to be operably synchronized with each other.

In the thus constructed video camera, the light emitting unit automatically emits light when the video camera photographs, thereby allowing the imaging area to be lit.

DESCRIPTION OF THE PREFERRED EMBODIMENTS

A preferred embodiment of the present invention is hereinafter described with reference to the drawings.

Figure 1:
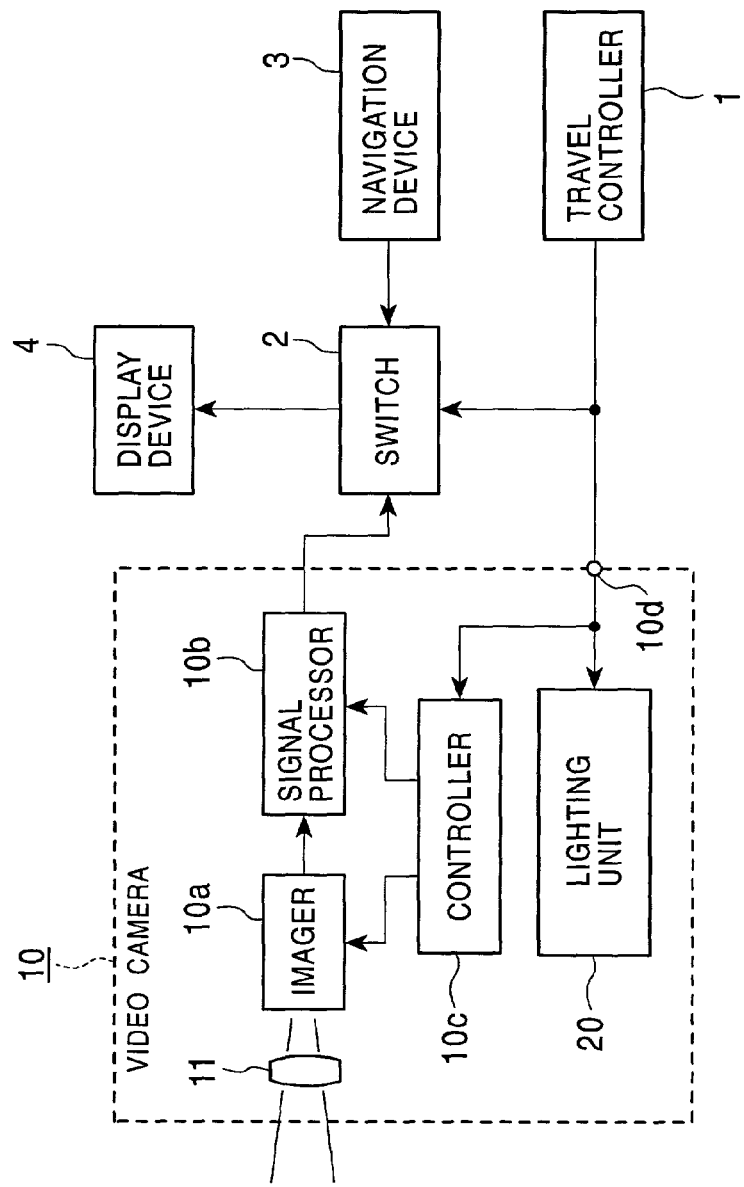
FIG. 1 is a block diagram of a system configuration including a video camera according to an embodiment of the present invention.

This embodiment provides an on-vehicle video camera mounted on an automobile which travels on the road. FIG. 1 shows the structure of an on-vehicle video camera 10 according to the present embodiment, and a system configuration of devices connected to the video camera 10. The video camera 10 is incorporated in one sideview mirror (outside mirror) positioned at either side of the automobile, as described later. The video camera 10 includes a lens 11 through which image light is focused onto an imager 10a, and the image light is converted into an electrical imaging signal in the imager 10a. The lens 11 may be a single focus lens capable of relatively wide angle photography. The imager 10a may be a CCD-type imaging device, a CMOS imaging device, or the like.

The imaging signal output from the imager 10a is supplied to a signal processor 10b, where the signal is amplified or corrected, before being video processed into a video signal in a predetermined format such as an NTSC video signal. The signal processor 10b may include an integrated circuit, called a digital signal processor (DSP), for partially performing a digital process. The video signal processed by the signal processor 10b is supplied as an output video signal of the video camera 10 to a display device 4 via a switch 2 located in the automobile. Other in-vehicle video devices such as a navigation device 3 are also connected to the switch 2, and an image to be displayed can be selected by the switch 2. The switch 2 may sometimes be incorporated in the navigation device 3 or the display device 4.

The imager 10a is an imager having sensitivity to visible light and having some magnitude of sensitivity to the near infrared wavelengths. Although the signal processor 10b can function as an infrared ray filter for filtering out an infrared signal component contained in an imaging signal, the infrared ray filtering function is not active in the present embodiment, and the signal processor 10b processes the imaging signal which has been captured by the imager 10a and which still contains a near infrared signal component. Since a near infrared signal component is contained in the imaging signal, there is a need for a process (characteristic settings for white balance adjustment) which adjusts the color balance of a color image when the output video signal of the video camera 10 is displayed. The characteristics when the infrared ray filter is working and is not working are described later.

The imaging operation of the imager 10a and the signal processing of the signal processor 10b are controlled by a controller 10c in the video camera 10. The controller 10c controls the imaging operation in response to a signal externally supplied via a control signal input terminal 10d. In the present embodiment, a signal operably associated with the operation of a turn signal is supplied from a travel controller 1 in the automobile, and, the controller 10c controls to turn on or off the imaging operation of the video camera 10 depending upon the signal state.

Specifically, a high-level signal is supplied to the input terminal 10d when the left turn signal mounted on the left side of the automobile is working, and a low-level signal is supplied to the input terminal 10d when the left turn signal is not working. Once the high-level signal is supplied to the controller 10c via the input terminal 10d, the controller 10c causes the imager 10a and the signal processor 10b to execute the imaging operation and the signal processing, respectively, and causes the video camera 10 to output the video signal. When the low-level signal is supplied to the controller 10c via the input terminal 10d, the controller 10c causes the imager 10a to stop the imaging operation, and prevent the video camera 10 from outputting the video signal.

In the present embodiment, a lighting unit 20 is built in the video camera 10 so that the light source of the lighting unit 20 illuminates an imaging area of the video camera 10. The light source of the lighting unit 20 is implemented as infrared light emitting diodes in the present embodiment. Again, a signal operably associated with the operation of the left turn signal of the automobile, which is supplied to the input terminal 10d, causes the light source of the lighting unit 20 to be turned on or off. Specifically, the light source of the lighting unit 20 is turned on when the high-level signal is supplied to the input terminal 10d, while the light source of the lighting unit 20 is turned off when the low-level signal is supplied to the input terminal 10d. A specific example of the circuit structure of the lighting unit 20 is described later.

The video signal captured and output by the video camera 10 according to the present embodiment is supplied to the switch 2. A video signal output from the navigation device 3 located in the automobile is also supplied to the switch 2, thereby switching a video to be displayed on the display device 4 depending upon the operational signal for the turn signal which is supplied from the travel controller 1 of the automobile. Specifically, for example, when the low-level signal is supplied from the travel controller 1 to the switch 2, the video signal output from the navigation device 3 is supplied to the display device 4, and causes a navigational image such as a road map to be displayed on the display device 4. When a switching signal is supplied from the travel controller 1 to the switch 2, the video signal captured and output by the video camera 10 is supplied to the display device 4, and causes the image captured by the video camera 10 to be displayed on the display device 4.

Figure 2:
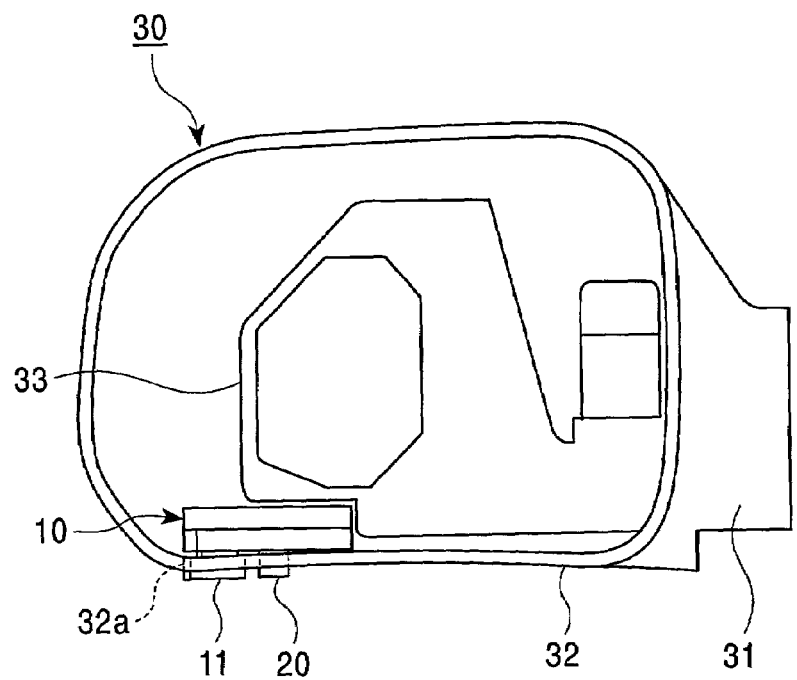
FIG. 2 is a plan view of a sideview mirror incorporating the video camera according to the embodiment of the present invention.
Figure 3:
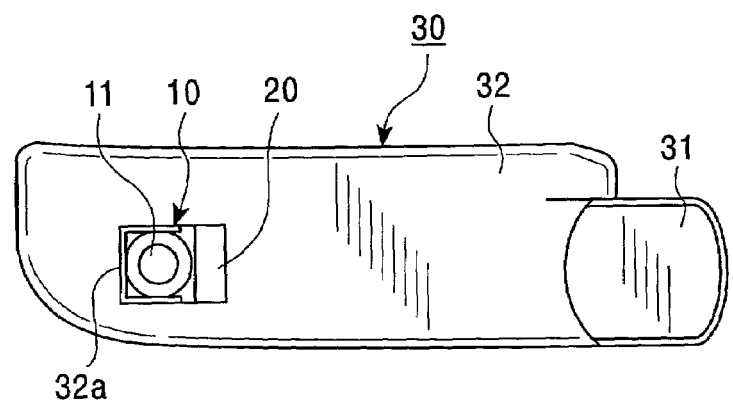
FIG. 3 is a bottom view of the sideview mirror incorporating the video camera according to the embodiment of the present invention.
Figure 4:
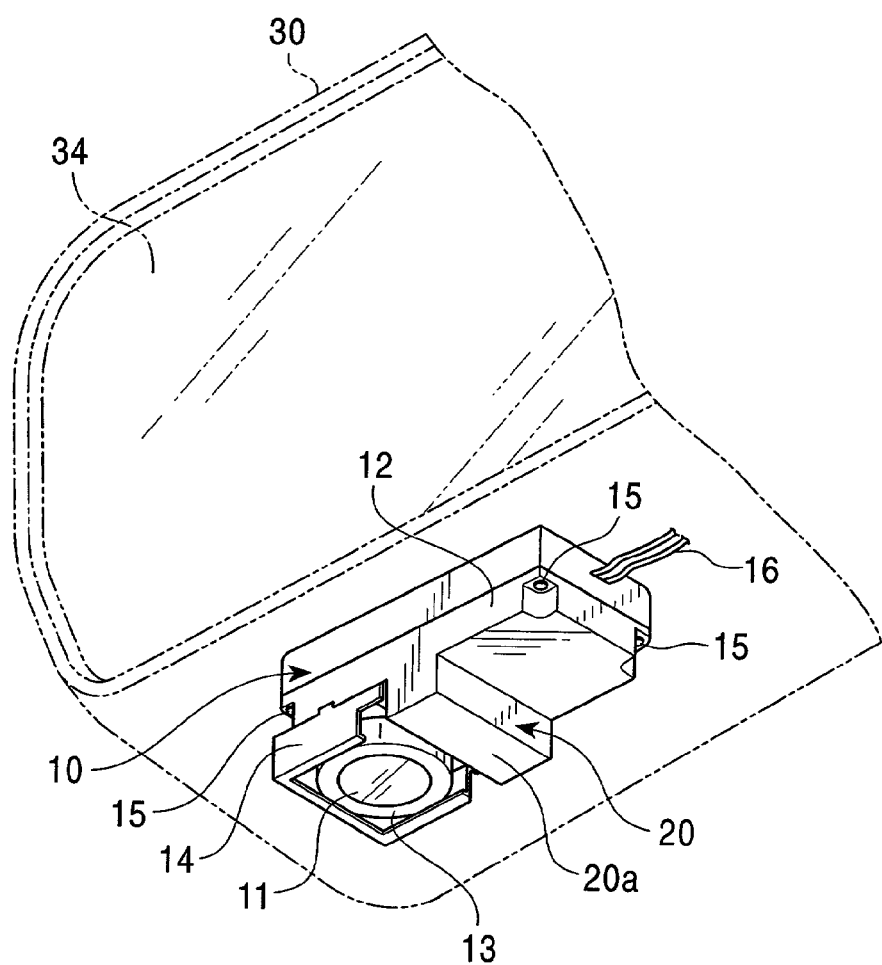
FIG. 4 is a perspective view of the sideview mirror incorporating the video camera according to the embodiment of the present invention.

FIGS. 2 to 4 show that the video camera 10 of the present embodiment is incorporated in a sideview mirror 30 of the automobile. In FIG. 2, a mirror portion is removed from the sideview mirror 30, so that the video camera 10 incorporated therein can appear. FIG. 3 is a bottom view of the sideview mirror 30 to which the video camera 10 is attached. FIG. 4 is a perspective view of the video camera 10 as viewed from the bottom, in which the position of the sideview mirror 30 is indicated by an imaginary line. As shown in FIG. 4, the video camera 10 is assembled in the sideview mirror 30 with the lens 11 oriented downward, and a light-emitting surface 20a of the lighting unit 20 is adjacent to the lens 11. As shown in FIGS. 2 and 3, the sideview mirror 30 of the present embodiment includes a joint 31 at one end which is attached to the front end of a door of the automobile, and an opening 32a at the other end in the bottom 32, which is far from the door, so that the lens 11 and the lighting unit 20 are exposed from the opening 32a.

The overall video camera 10 is configured by an elongated housing 12 formed of synthetic resin, as shown in FIG. 4. The lens 11 is supported by a lens supporting member 13, and is surrounded by a lens protection frame 14. Screw holes 15 are formed at the four corners of the housing 12, through which the housing 12 is fixedly screwed to the bottom surface of the sideview mirror 30. A connection cable 16 is led from an end of the housing 12 for connecting to an in-vehicle component in the automobile. In FIG. 2, the sideview mirror 30 includes a mirror holding mechanism 33, which is used to hold a mirror 34 indicated by an imaginary line in FIG. 4. If the mirror holding mechanism 33 is powered by a motor or the like, the position of the mirror 34 that is held by the mirror holding mechanism 33 can be adjusted by a key operation.

Figure 5:
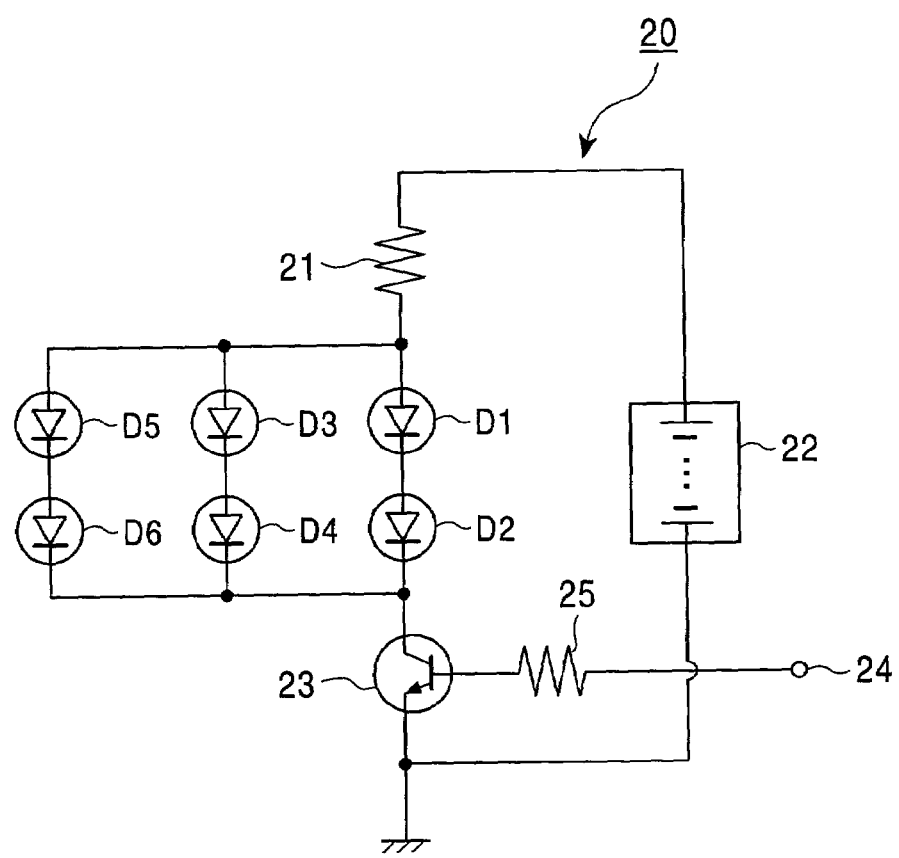
FIG. 5 is a circuit diagram of an example of the structure of a lighting unit of the video camera according to the embodiment of the present invention.

FIG. 5 is a circuit diagram of the lighting unit 20 incorporated in the video camera 10 in the present embodiment. The lighting unit 20 includes six infrared light emitting diodes D1, D2, D3, D4, D5, and D6 as the light source. Pairs of the serially connected diodes D1 and D2, D3 and D4, and D5 and D6 are connected in parallel, as shown in FIG. 5. The infrared light emitting diodes D1 to D6 emit near infrared light having a wavelength of approximately 900 nm. Specifically, infrared light emitting diodes having output wavelengths of 850 nm, 880 nm, 940 nm, etc., which are commercially available, may be employed.

The anode of each of the light emitting diodes D1, D3, and D5 which are connected in parallel is connected to the positive pole of a power supply 22 via a resistor 21, while the cathode of each of the light emitting diodes D2, D4, and D6 is connected to the collector of an NPN transistor 23. The resistor 21 is a device for controlling a current flowing to the light emitting diodes. The emitter of the transistor 23 is connected to the negative pole of the power supply 22. A signal (operational signal for the left turn signal) which is input to the control signal input terminal 10d of the video camera 10 is supplied to the base of the transistor 23 via a resistor 25 from a control signal input terminal 24.

With the structure shown in FIG. 5, if the signal input to the input terminal 24 is a high-level signal, the transistor 23 is turned on to connect the power supply 22 to the light emitting diodes D1 to D6, thereby causing the light emitting diodes D1 to D6 to emit light. The light emission provides illumination for the imaging area of the video camera 10. If the signal input to the input terminal 24 is a low-level signal, the transistor 23 is turned off to prevent the light emitting diodes D1 to D6 from emitting light.

Figure 6:
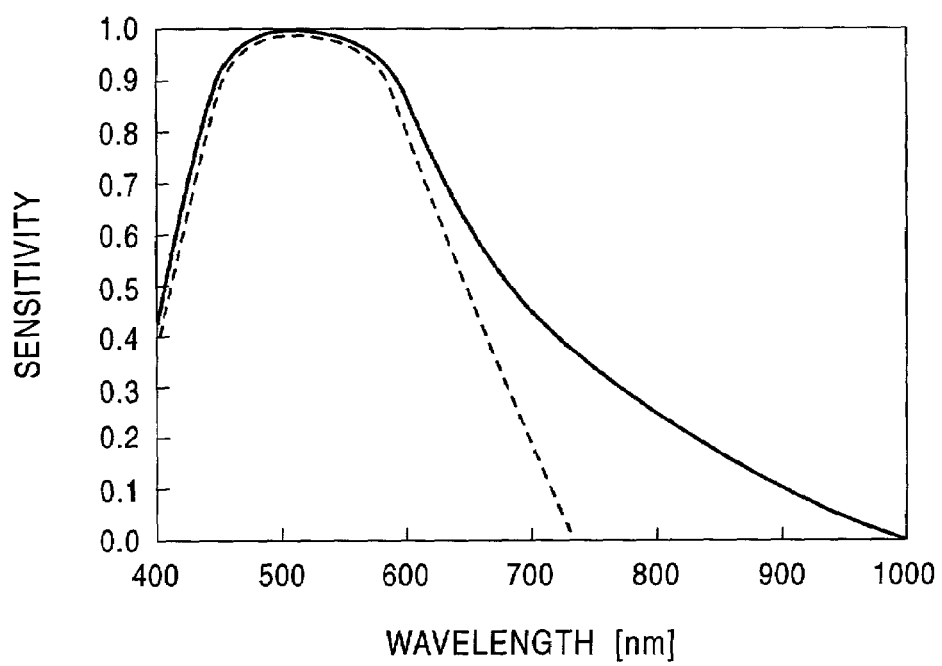
FIG. 6 is a characteristic view of a characteristic of the video camera according to the embodiment of the present invention.

FIG. 6 shows a characteristic of the imaging sensitivity of the video camera 10. FIG. 6, in which the abscissa indicates the light wavelength and the ordinate indicates the imaging sensitivity, shows that the sensitivity decreases as the wavelength with respect to the maximum sensitivity of 1.0 increases. In FIG. 6, the solid line indicates the sensitivity of the video camera 10 of the present embodiment, and the dashed line indicates the sensitivity of a video camera in which an infrared ray filter is working in the signal processor 10b (in the present embodiment, the infrared ray filter is not working). The video camera 10 in the present embodiment can exhibit the imaging sensitivity to some extent (approximately 20% to 10% of the maximum sensitivity) at the wavelength ranging from 800 nm to 900 nm that corresponds to a part of the near infrared bandwidth.

Figure 7:
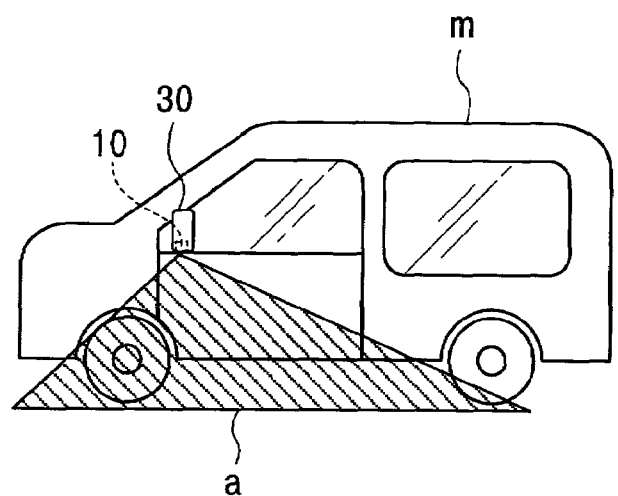
FIG. 7 is a side view of an imaging and lighting area of the video camera according to the embodiment of the present invention.
Figure 8:
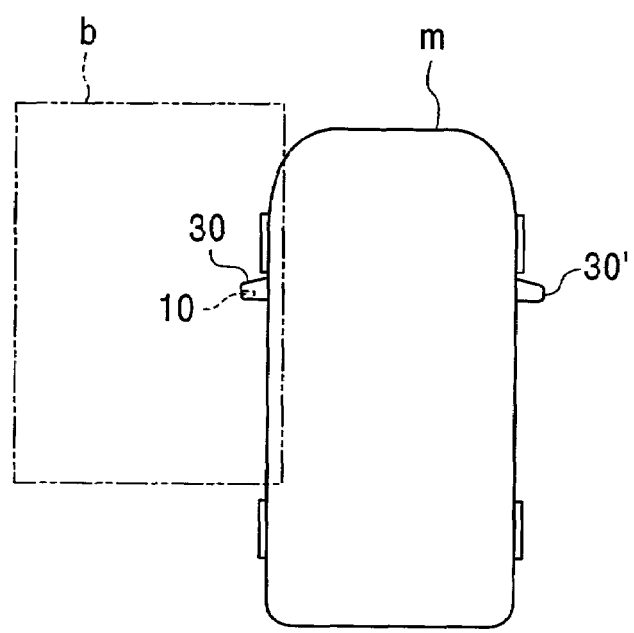
FIG. 8 is a top plan view of the imaging and lighting area of the video camera according to the present invention.

The imaging area of the video camera 10 in the present embodiment when the sideview mirror 30 incorporating the video camera 10 is assembled with an automobile m is described with reference to FIGS. 7 and 8. The present embodiment assumes that the automobile m is a so-called right-hand-drive vehicle in which the driver's seat is at the right side, and the sideview mirror 30 is attached to the left door. The video camera 10 is mounted on the bottom of the sideview mirror 30 so that a predetermined area parallel to the left side of the automobile m is photographed by the video camera 10. The imaging area is indicated by "a" in FIG. 7 which is a side view of the automobile m, and the imaging area is indicated by "b" in FIG. 8 which is a top plan view of the automobile m. As can be seen in FIG. 8, the imaging area b is adjusted so as to allow the driver to slightly view the left door of the automobile m, and the video camera 10 is caused to photograph in the orientation where the horizontal direction of the imaging plane corresponds to the direction parallel to the left door of the automobile m. That is, a standard video camera uses a landscape imaging plane having horizontal sides longer than the vertical sides, in which the direction of the longer sides corresponds to the direction parallel to the left door of the automobile m, thereby allowing the vicinity of the left side of the automobile m from the front to the rear to be captured in a relatively long range. The lighting unit 20 is caused to light the area that substantially covers the overall imaging area a or b.

The video camera 10 may also be incorporated in a sideview mirror 30' attached to the driver side or the right side, as shown in FIG. 8, so as to capture the vicinity of the right side of the automobile m.

When a video signal captured by the video camera 10 in the manner shown in FIG. 8 is displayed on a display device installed in the automobile m, the image is rotated 90° from the landscape to portrait orientation so that the orientation parallel to the left or right side of the automobile m may be turned to the vertical orientation on the screen of the display device. This rotation allows the orientation of the displayed image to match the actual orientation, thereby allowing the driver to readily understand the position relationship in the displayed image. The process for 90° rotation of the displayed image from the landscape to portrait orientation may be performed by the video camera 10, by the display device, or by a device, such as a switch 2 shown in FIG. 1, which is connected between the video camera 10 and the display device.

In this way, the imaging operation is performed by the video camera 10 mounted on a sideview mirror of the automobile, and the resulting video signal is supplied to the display device 4 via the switch 2 in the system configuration shown in FIG. 1 for display, thereby providing increased visibility of the left or right side of the automobile on the image displayed on the display device 4. Particularly, in the present embodiment, the imaging operation of the video camera 10 and the lighting operation of the lighting unit 20 are performed in a manner synchronous with the operation of a turn signal of the automobile, between which the switch 2 selects an image of the video camera 10. Therefore, the driver need only operate the left turn signal of the automobile to automatically display an image of the left or right side of the automobile on the display device 4, thereby improving usability.

According to the present embodiment, the lighting unit 20 including light emitting diodes as the light source is incorporated in the video camera 10 to illuminate the imaging area of the video camera 10. This can provide desirable imaging and displaying if the surroundings of the automobile are in the dark. Since infrared light emitting diodes are used herein, the emitted light is not viewed by the human eye, and there is no undesirable visible light externally emitted from the automobile.

Since the infrared light emitting diodes are diodes which emit a near infrared signal having a wavelength of approximately 900 nm, the video camera 10 can be implemented as a standard visible-light photography video camera rather than a special infrared photography video camera, resulting in successful night photography at low cost. Specifically, the video camera 10 is implemented as a video camera having a standard imager for use in visible-light photography, without filtering out of an infrared signal component contained in an imaging signal by the signal processor 10b of the video camera 10, and the imager's sensitivity to a near infrared signal is used for night photography. This enables night photography to be successful without a special imager having higher sensitivity to an infrared signal.

In the illustrated embodiment, the lighting unit 20 emits light each time the imaging operation is performed by the video camera 10; however, the lighting unit 20 may be activated according to the necessity of lighting. For example, in order for the controller 10c in the video camera 10 to determine a signal which is synchronous with the operation to turn on the lights of the automobile, the controller 10c may cause the light emitting diodes in the lighting unit 20 to be turned on in response to the imaging operation only when a light of the automobile is turned on. A sensor for sensing the ambient light around the vehicle may be mounted on the video camera 10 or the like, so that the controller 10c causes the light emitting diodes in the lighting unit 20 to be turned on in response to the imaging operation only when it is determined from the sensor output that the surroundings of the automobile are in the dark. Alternatively, the light emission of the lighting unit 20 may be controlled by determining the necessity of lighting on the basis of the level of the imaging signal obtained in the video camera 10.

In this way, if the lighting operation of the lighting unit 20 is selectively performed, the processing characteristic of the signal processor 10b in the video camera 10 may be switched between the imaging operation in a bright environment in the daytime and the imaging operation using a light at night. For example, for the imaging operation in a bright environment in the daytime, an infrared ray filter may be activated in the signal processor 10*b* to achieve an imaging signal exhibiting the characteristic indicated by, for example, the dashed line in FIG. 6, in order to process the imaging signal. For the imaging operation using a light at night, however, an infrared ray filter may be inactive in the signal processor 10*b* to process an imaging signal containing an infrared signal component. Therefore, characteristic optimization of the output image signal can be achieved for either imaging operation.

In order to turn on the lighting unit 20, the light emitting diodes may not continuously emit light during the imaging operation but may intermittently emit light in a manner synchronous with the imaging timing of the imager 10*a*. In other words, the light emitting diodes may be turned on in a period synchronized with the period at which the imaging operation is performed by the imager 10*a* at every field of the video signal. This would reduce power consumption in the lighting unit 20 accordingly.

Although the imaging operation of the video camera 10 and the displaying operation of the display device 4 are performed in a manner synchronous with the operation of the turn signal, these operations may be performed independently of the operation of the turn signal. For example, an operation key for a side monitor system may be positioned in the vicinity of the driver's seat, such that the imaging operation is performed by the video camera 10 in response to manipulation of the operation key to provide visibility of an area at the side of the automobile. The viewing operation based on the operation key and the above-described viewing operation based on the turn signal may be combined.

The illustrated embodiment has been described in which an output image of the video camera 10 and an output image of the navigation device 3 are switched by the switch 2 for displaying on the display device 4. For example, when the left turn signal is operated, the switch 2 may synthesize an output image from the navigation device 3 with an output image from the video camera 10 to cause the synthesized image to be displayed on the display device 4. For instance, when the left turn signal is operated, in a display screen 5 of the display device 4 shown in FIG. 9, an image captured by the video camera 10 may be displayed on the left-hand region 5*a*, while a navigational image, such as a road map, which is output from the navigation device 3 may be displayed on the right-hand region 5*b*. The position relationship between the left side of the automobile m and a neighbor vehicle x can be understood from a display image on the left-hand region 5*a* shown in FIG. 9.

Figure 9:
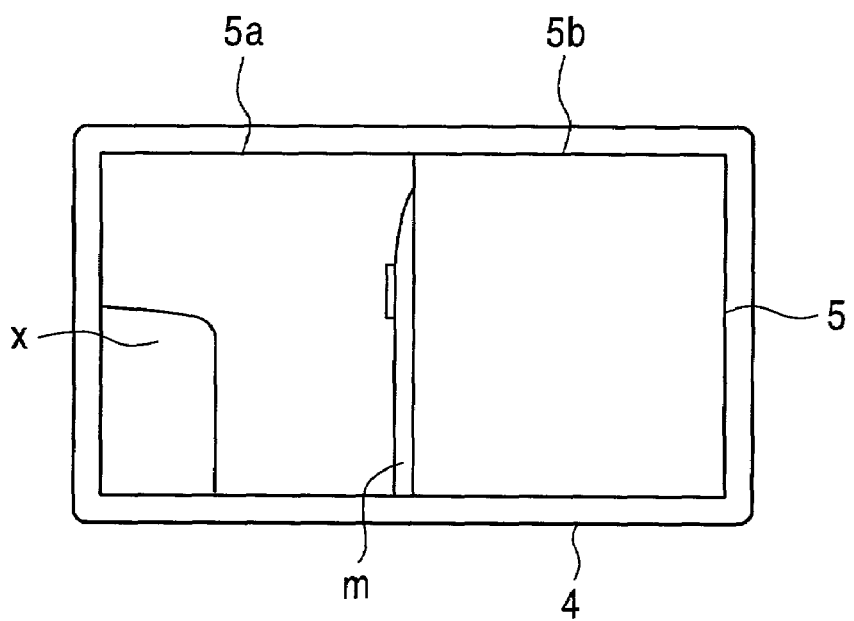
FIG. 9 is a diagram of a display according to an embodiment of the present invention.

In the case where a video camera is also mounted on the sideview mirror 30' at the right side shown in FIG. 8, an image captured by the video camera incorporated in the left sideview mirror 30 may be displayed on the left-hand region 5*a*, while an image captured by the video camera incorporated in the right sideview mirror 30' may be displayed on the right-hand region 5*b* on the screen 5 shown in FIG. 9.

Although the illustrated embodiment has been described in which a video camera is incorporated in an outside mirror of an automobile, an on-vehicle video camera for use in any other application may be implemented in the same way.

What is claimed is:

1. An on-vehicle video camera comprising:
    imaging means incorporated in an exterior sideview mirror of the vehicle for converting image light into an electrical imaging signal and outputting the imaging signal as a video signal in a predetermined format;
    light emitting means for lighting an imaging area of said imaging means at the exterior of the vehicle; and
    control means for controlling an imaging operation of said imaging means and a lighting operation of said light emitting means so as to be operably synchronized with each other,
    wherein said control means determines illuminance of the surroundings of the vehicle, and causes said light emitting means to emit light during the imaging operation of said imaging means according to a determined illuminance.

2. The on vehicle video camera according to claim 1, wherein said light emitting means includes means for emitting infrared light in a predetermined band, and said imaging means is responsive to an infrared signal component in the predetermined band.

3. The on vehicle video camera according to claim 1, wherein said control means causes said light emitting means to emit light during the imaging operation of said imaging means when said control means detects that a vehicle turn signal has been turned on.

* * * * *